United States Patent [19]

Schilling

[11] Patent Number: 4,944,804

[45] Date of Patent: Jul. 31, 1990

[54] PLASTER OF PARIS (STUCCO) AS MIXING AID FOR AQUEOUS BITUMINOUS EMULSION AGGREGATE SLURRIES

[75] Inventor: Peter Schilling, Charleston, S.C.

[73] Assignee: Westvaco Corporation, New York, N.Y.

[21] Appl. No.: 265,268

[22] Filed: Oct. 31, 1988

[51] Int. Cl.$^5$ .............................................. C08L 95/00
[52] U.S. Cl. ................................... 106/277; 106/283; 106/284.1; 106/284.2; 106/284.06; 106/670; 106/669
[58] Field of Search ............ 106/277, 116, 283, 284.1, 106/284.2, 284.06, 284.4

[56] References Cited

U.S. PATENT DOCUMENTS

| | | | |
|---|---|---|---|
| 2,399,411 | 4/1946 | Watts et al. | 106/116 |
| 4,447,269 | 5/1984 | Schreuders et al. | 106/277 |
| 4,450,011 | 5/1984 | Schilling et al. | 106/277 |
| 4,462,840 | 7/1984 | Schilling et al. | 106/277 |
| 4,464,286 | 8/1984 | Schilling et al. | 106/277 |
| 4,478,642 | 10/1984 | Schilling et al. | 106/277 |
| 4,494,992 | 1/1985 | Schilling et al. | 106/284.4 |
| 4,547,224 | 10/1985 | Schilling | 106/277 |
| 4,561,901 | 12/1985 | Schilling | 106/277 |
| 4,597,799 | 7/1986 | Schilling et al. | 106/277 |
| 4,810,299 | 3/1989 | Schilling et al. | 106/277 |

Primary Examiner—Paul Lieberman
Assistant Examiner—Helene Klemanski
Attorney, Agent, or Firm—Terry B. McDaniel; Richard L. Schmalz

[57] ABSTRACT

Improved mixability (extended set time) and adhesion (asphalt coating on aggregate) are disclosed for cationic and anionic bituminous emulsion-aggregate paving slurries by the addition to the emulsion-aggregate mixture of small amounts of calcium sulfate hemihydrate (Plaster of Paris).

8 Claims, No Drawings

PLASTER OF PARIS (STUCCO) AS MIXING AID FOR AQUEOUS BITUMINOUS EMULSION AGGREGATE SLURRIES

BACKGROUND OF THE INVENTION (1) Field of the Invention

The present invention relates to mixing-grade, quick-setting and slow-setting cationic aqueous bituminous emulsion-aggregate paving slurry seal mixtures. More particularly, the present invention relates to paving slurries formed with cationic and anionic emulsions prepared by emulsifying bitumen, such as an asphalt, in water with cation-active or anionic-active emulsifier and combining the emulsion with fine-grained aggregate.

The invention relates specifically to Plaster of Paris (Stucco, calcium sulfate hemihydrate) which is added to the slurry mix to extend mixing time at ambient and elevated temperatures and improve adhesion performance of the asphalt to the aggregate.

(2) Description of the Prior Art

Conventionally, emulsion slurry seals are formulated from (1) mineral aggregate which is a fine stone aggregate and/or mineral filler and (2) about 15% to about 25% by weight thereof of a mixing-grade, slow-setting emulsion containing from about 50% to about 75% by weight of bituminous residue (usually asphalt), with a further addition of about 5% to about 25% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing all through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such a mixture with aggregate, the aqueous emulsion form of the bituminous material has been generally preferred because it is less hazardous and more economical to use than hot mix or cutback (solvent containing) asphalts. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the earlier conventional anionic emulsions. Bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic and anionic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form such as in gun application or spreader box application. Therefore, since the slurry seal should mix well, pump well, lay down well, not stiffen while being applied, and, after setting, wear well under traffic, it is particularly desirable to be able to control the setting time of the slurry for various aggregates employed.

Acidified polyamine condensates of certain polycarboxylic acids, anhydrides, sulfonated fatty acids and epoxidized glycerides with certain polyamines are suitable emulsifiers yielding asphalt emulsions which can be mixed with fine grained aggregate to give workable aggregate/emulsion mixes.

These types of emulsifiers are disclosed in U.S. Pat. No. 4,447,269 to Schreuders et al., U. S. Pat. No. 4,450,011 to Schilling et al., U. S. Pat. No. 4,547,224 to Schilling et al., U. S. Pat. No. 4,462,890 to Schilling et al., U. S. Pat. No. 4,464,286 to Schilling, and U. S. Pat. No. 4,597,799 to Schilling.

However, cationic emulsions produced with the emulsifiers can only be mixed with aggregates when the temperature of the emulsion or the aggregate is below 100° F or when the aggregate surfaces are only moderately charged. In hotter climates where the temperature of the mixes are as high as 120° F and when highly charged aggregates have to be used, these emulsions fail the mixing process.

Anionic emulsifiers, which are very versatile and which properties can be widely varied by changing of the pH-value of the corresponding soap solutions, are prepared by reacting the above described polyamine condensates with acrylic acid, metacrylic acid, fumaric acid, maleic acid, chloroacetic acid, formaldehyde and sodium sulfite and other reactive acids capable to substitute one or more hydrogens attached to the nitrogen atoms of the polyamines. Emulsifiers of this type are disclosed in U.S. Pat. No. 4,478,642 to Schilling et al., U.S. Pat. No. 4,494,992 to Schilling et al., and U.S. Pat. No. 4,547,224 to Schilling.

Ferm in U.S. Pat. No. 3,740,244, teaches the preparation of quick setting anionic slurry seal compositions by applying a combination of anionic emulsifiers such as arylethyl sulfonates and condensation products of alkylphenols with ethyleneoxide; Schreuders in U.S. Pat. No. 3,615,796 teaches the use of petroleum sulfonates a quick setting anionic emulsifier. However, emulsions prepared with these types of emulsifiers show, in contrast to emulsions prepared with cationic emulsifiers, poor adhesion of asphalt to the aggregate. This can be determined with the boiling test, where slurry seal specimens after setting and curing are boiled in water for 10 minutes and the area of uncoated stone (aggregate) is determined.

When alkyl sulfonates are used as the emulsifier, the adhesion of the asphalt to the aggregate in the final matrix is known to be very poor (less than 30-40%). The tall oil derived aminoalkyl carboxylic acids are improved products in this respect (50-70% coating). The percent coating achieved by using these emulsifiers can be influenced by the pH-value at which the emulsions are prepared. In order to obtain better mixing performance of the emulsions with the aggregate, it is necessary to increase the pH-value of the soap to pH-values higher than 11.0 or to add small amounts of alkali to the mixing water prior to the addition of the anionic bituminous emulsion. The higher the pH-value, the higher the degree of ionization of the carboxyl groups. However, increasing the pH-value is detrimental to the adhesion performance of the asphalt to the aggregate. Both properties are based on the repulsive forces between the negatively charged asphalt droplets and the negatively charged aggregate surfaces.

Accordingly, an object of this invention is to provide a neutral mixing aid which, when added in small amounts to a cationic slurry seal mix, prolongs mixing time and allows to place mixes at elevated temperatures (up to 120°–130° F.), and improves adhesion.

A further objective is to provide a neutral mixing aid which, when added in small amounts to an anionic emulsion prepared at high pH-value, restores or improves the adhesion of asphalt to aggregate in the resulting slurry seal matrix after evaporation of the water.

A further object of this invention is to provide a novel mixture of aggregate and bituminous emulsion.

A further object is to provide a mixture of the above character which is workable under a broad range of conditions.

Another object is to provide a mixture of cationic bituminous emulsion and aggregate whose setting time can be varied.

A particular object is to provide an aqueous bituminous emulsion fine-grained aggregate slurry mixture which deposits at a fairly rapid rate after being applied to the surface to be treated, and is usable for a longer period of time to enable application in slurry form.

SUMMARY OF THE INVENTION

The above objectives are met by the addition of calcium sulfate hemihydrate (Plaster of Paris) in the aqueous bituminous emulsion-aggregate slurries formed with cationic and anionic emulsions prepared by emulsifying bitumen, such as an asphalt, in water with, respectively, a cation-active or an anion-active emulsifier.

The use of gypsum, a similar chemical, in asphalt emulsion technology is disclosed in East Germany Patent 98,104 to Heerwig et al. Up to 30%, preferentially 3–5%, gypsum is used in anionic slurry seal to decrease setting time to 3–15 minutes, or in anionic rapid setting emulsion technology about 3% gypsum is added to the aggregate to increase, rather than decrease, the rate of breaking when the aggregate is placed on top of the emulsion.

DESCRIPTION OF THE PREFERRED EMBODIMENTS

A typical cationic or anionic aqueous bituminous emulsion aggregate slurry is formulated in the laboratory with an amount of aggregate pre-wetted with water and mixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water, inorganic or organic additive and emulsion components may be used. A typical unit is equipped with separate tanks for aggregate, water, additive and emulsion which are continually metered into a mixing chamber at a pre-determined ratio. The continually fed components are retained in the mixing chamber for approximately one minute and then fed into a spreader box and applied to the surface to be coated. Batch operated pneumatic devices can also be used for suitable placement of the cationic bituminous aggregate slurries of this invention.

The slurry of this invention broadly comprises aggregate and a bituminous emulsion made up of bitumen, water and an emulsifier, as well as the Plaster of Paris.

The cationic emulsifiers of this invention are $C_8$–$C_{20}$ fatty amines, $C_8$–$C_{20}$ fatty propane diamines, $C_8$–$C_{20}$ fatty triamines, $C_8$–$C_{20}$ fatty tetramines, and the reaction products of polyamines reacted with a polycarboxylic acid and anhydrides of the general formula wherein x and y are integers from 3 to 9, x and y together equal 10–14, at least one Z is a carboxylic acid group and any remaining Z is hydrogen.

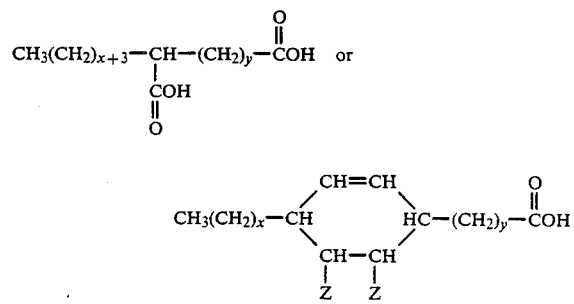

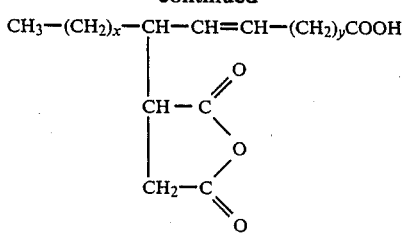

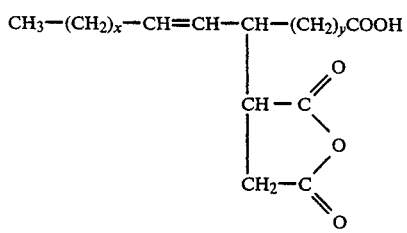

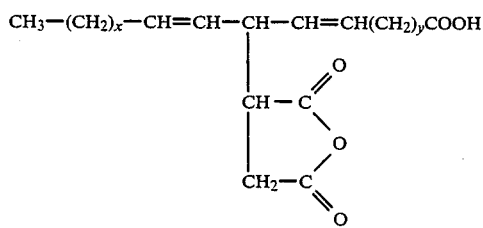

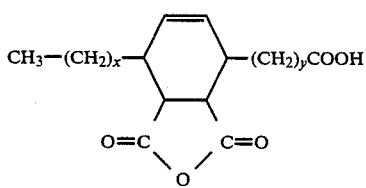

Additional cation-active emulsifiers, which in the presence of Plaster of Paris give improved slurry seal-/aggregate mixes, are reaction products of polyamines with sulfonated fatty acids, with resin acids (rosin) reacted with maleic anhydride or fumaric acid, nd epoxidized esters of unsaturated fatty esters such as tallates, oleates, linoleates, and glycerides such as vegetable oils and animal fats.

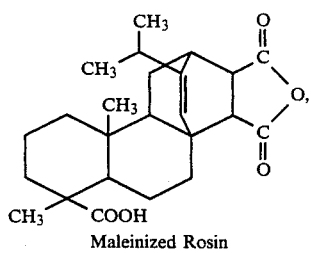

Maleinized Rosin

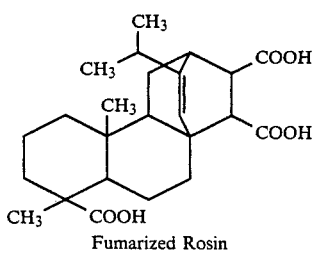

Fumarized Rosin

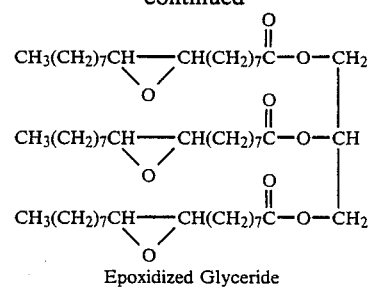

Epoxidized Glyceride

As a general example, the reaction products of the $C_{21}$-dicarboxylic acid and diethylene triamine are described. By blending two moles of diethylene triamine with one mole of $C_{21}$-dicarboxylic acid, a bis-diethylene diammonium salt is formed, which upon heating to 230° C. forms the diaminodamine of the formula:

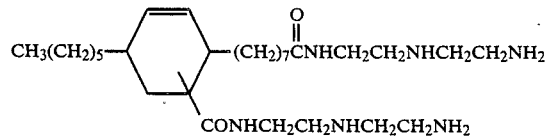

At the same time, in a competitive reaction, ring closure to an imidazoline structure is formed, which is a five membered ring containing two nitrogens, as shown in the following structure:

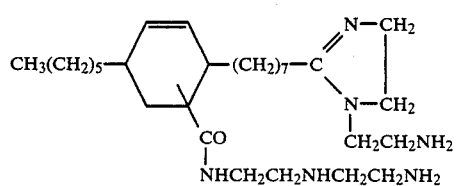

Further prolonged heating of the above structure to 270°–280° C. gives the diimidazoline of the formula:

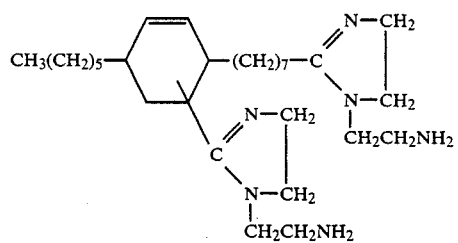

These products are, however, never obtained in high purity, since when a blend of two moles diethylene triamine and one mole of $C_{21}$-dicarboxylic acid is heated slowly, some of the diethylene triamine distills with the water. Thus, upon prolonged heating, in addition to the products, polymers of the polyamide type are formed as by-products.

Polyamines suitable are those which are able to form imidazolines or amidoamines with carboxylic acids such as ethylene diamine, diethylene triamine, triethylene tetramine, tetraethylene pentamine, pentaethylene hexamine, and higher homologues: N-aminoethyl propane diamine, N,N'-diaminoethyl propane diamine and the N-aminoethyl- or N,N'-diaminoethyl-substituted butane diamines, pentane diamines and hexane diamines, and N-hydroxy ethyl ethylene diamine. These compounds have the general formula

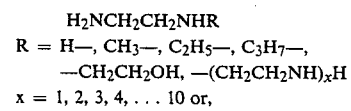

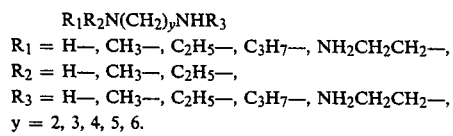

Amines capable of forming amidoamines but not imidazolines are: 1,3-diaminopropane, 1,4-diaminobutane, 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N-aminohexylhexane diamine-1,6.

In addition, polyamines containing other functionalities such as ether (—O—), thioether (—S—), sulfoxide (—SO—), sulfone (—SO$_2$—) groups, as well as aromatic structures are also suitable for condensation.

$$R_1H_2N(CH_2)_xY(CH_2)_zNH_2$$
$$Y = O, S, SO, SO_2, C_6H_5—$$
$$x - 2-10$$
$$Y = 2-10$$

Further modification of the above described polyamino amidoamines are their reaction products with reactive oxirane systems such as ethylene oxide, propylene oxide or butylene oxide. Reaction occurs initially on primary and secondary nitrogens, that is, a nitrogen to which one or two hydrogen atoms are covalently bound. The reaction products belong to the class of N-hydroxyethyl-, N-2-hydroxypropyl- and N-2-hydroxy butyl -amino amidoamines. If excess oxirane is reacted, polyethylene oxides, polypropylene oxides or polybutylene oxides are obtained. The hydroxyl groups will also react in this case.

Another modification may involve the use of an alkylating agent such as methyl-, ethyl-, or benzyl halides, sulfates, phosphates, etc. The resulting compounds are classified as mono-, di-, or trialkylquaternary ammonium salts. Their main characteristic is their solubility in aqueous systems without addition of acid, as is the case with amines, amidoamines.

Depending on the numbers of active nitrogens in these nitrogen-containing derivatives, one, two or more moles of reagent per mole of amidoamine or imidazoline can be reacted. To illustrate the novel modifications of the above described amidoamines and imidazolines, the reaction product of two moles aminoethylpiperazine or diethylene triamine with one mole of C$_{21}$-dicarboxylic acid will serve as intermediate.

In the case of the di-amindoamine:

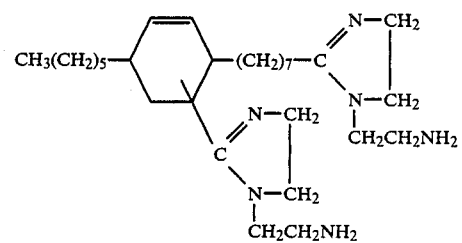

one or two moles of reagent can be added to the terminal NH—groups.

In the case of the di-imidazoline:

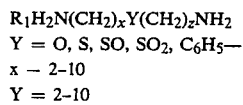

one to four moles of reagents will react with the terminal NH$_2$—groups.

The following structures are obtained by reaction with:

(a) formaldehyde and sodium sulfite or bisulfite

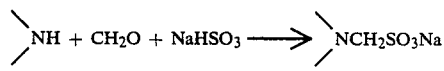

(b) haloalkanoic acids (or sodium salts)

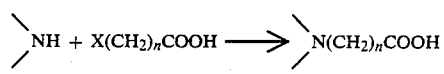

X = Cl, Br, I
n = 1, 2, 3, 4 . . .

(c) -unsaturated carboxylic or dicarboxylic acids:

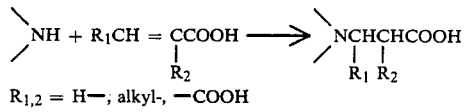

R$_{1,2}$ = H—, alkyl-, —COOH

Anionic emulsifiers are the complex polyamino acids obtained when the above fatty amines, fatty diamines, fatty polyamines, or the reaction products of polyamines with the above described polycarboxylic acids, anhydrides or esters are reacted with unsaturated acids such as acrylic acid, metacrylic acid, maleic acid, and fumaric acid, or haloalkane carboxylic acids, such as chloroacetic acid or by sulfomethylation with formaldehyde and sodium sulfite or sodium bisulfite.

In preparing the bituminous emulsions of this invention, an aqueous soap solution of the emulsifiers described below is intimately mixed under high shear in a colloid mill. The bitumen content can range from 30% to about 80% by weight, preferably between 60% and 70%. The dosage of the emulsifier can range from 0.2–10% by weight of the emulsion, preferably between 0.25–2.5% by weight of the emulsion. Dependent on the emulsifier, a mixing grade cationic emulsion is obtained in a pH range of 1–7, with the optimum performance at a pH of about 2.5 to 4. An anionic mixing grade emulsion, on the other hand, is obtained in a pH range of greater than 7 to 12, with the optimum performance at a pH of about 10-11.5.

The "bitumen" used in the emulsion may be derived from domestic or foreign crude oil it also includes bitumen, natural asphalt, petroleum oil, oil residue of paving grade, plastic residue from coal tar distillation, petroleum pitch, and asphalt cements diluted with solvents (cutback asphalts). Practically any viscosity or penetration graded asphalt cement for use in pavement construction as described in ASTM designation D-3381 and D-946 may be emulsified with the aid of the emulsifiers of the invention.

The acidic soap solutions are normally obtained by suspending the amidoamine in water to which a sufficient amount of a suitable acid, for instance, hydrochloric, sulfuric, and phosphoric acid or the like is added as necessary for the desired pH value of 1-7 and a clear emulsifier solution is obtained. Alkaline soaps are obtained by adding sodium hydroxide or any other suitable base to the aqueous suspension of the emulsifier. Thereafter, the (acidic or alkaline) soap solution, which is preheated to about 55° C., and the fluid asphalt, which is preheated to 120°-125° C., are mixed under high shear in a colloid mill for 30 seconds to give asphalt emulsions of brown color and creamy texture. Prior to testing according to ASTM D-244, the emulsions are stored at 70° C for 16 hours. Aggregate mixing tests are performed by placing a weighted amount of aggregate in a mixng bowl, adding 5-10% by weight of the emulsion on top of the aggregate and mixing for one minute to five minutes.

A typical aqueous bituminous emulsion aggregate slurry is formulated in the laboratory with an amount of aggregate pre-wetted with water and admixed with a suitable bituminous emulsion to a desired consistency. Suitable consistency is obtained by using mixing gradations of aggregates forming a smooth non-separating uniform mixture of aqueous bituminous emulsion-aggregate which can be evenly spaced onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water, inorganic and organic additives emulsion components, may be used. A typical unit is equipped with separate tanks for aggregate, water, emulsion and additives which are continually metered into a mixing chamber at a pre-determined ratio. The continually fed components are retained in the mixng chamber for approximately one minute and then fed into a spreader box and applied to the surface to be coated. Batch operated pneumatic devices can also be used for successful placement of the bituminous aggregate slurries of this invention.

Depending on the type of aggregate and its cleanliness, mixing is improved when aggregate is prewetted with 1-5% water by weight of the aggregate. The performance of the asphalt emulsions in regard to mixing characteristics and setting (higher percentage of one-hour washoff coat) can, if necessary, also be improved when, based on the weight of asphalt, 1-15% of a solvent such as diesel oil is added to the asphalt prior to emulsification. The emulsions prepared with the emulsifiers disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equiment, or manually.

The aggregates of the invention paving slurry seal mixtures are conventionally difficult to coat, densely graded aggregates such as sand, pit-run, crusher-run etc., which range in size from anything passing through a No. 4 sieve and at least 80% retained on 200mesh (U.S. Standard Series).

Aggregate mixing tests are performed by mixing the aggregate with water and aqueous bituminous emulson. An inorganic additive-mineral filler, such a portland cement, hyrated lime, limestone dust and fly ash, may be added to accelerate set/break time and salts, such as ammonium sulfate, aluminum sulfate and iron sulfate, or surfactants may be added to retard the set/break of the slurry system. Mineral fillers shall comply with requirements of ASTM D-242. These materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to stimulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D-3910 are used to measure strength and other physical properties of the slurry. The Performance Guide for Slurry Seal published by the Asphalt Emulsion Manufacturers Association is used to measure the performance of the slurry seal.

The emulsion should be stable during mixing and should set within the designed time period following application. The emulsifiers of this invention perform very satisfactorily, however, when temperatures above 100° F. are reached, especially in southern climates, the emulsion will break permaturely resulting in difficulties in laying down a high performance slurry seal.

By addition of Plaster of Paris to the cationic slurry seal mix, it is possible to maintain mixability at temperatures up to 120°-130° F. By adding small amounts of alkali to anionic slurry mixes, mixability can be improved. In the latter case, coating performance of the asphalt, as determined by the boiling water test deteriorates. Addition of Plaster of Paris eliminates this problem.

The following examples show the utility of small amounts of Plaster of Paris in anionic and cationic slurry seal mixes.

EXAMPLE I

This example shows the improvement of mixing behavior of cationic emulsion/aggregate slurry. Emulsions were prepared with Edgington ® Hard Base Asphalt at 64% residue and emulsion pH 2.5. An Arizona aggregate was used for the slurry seal experiments. Mixing temperature was 120° F. Slurry were prepared by adding to 100g of aggregate, 16% of the cationic aqueous bituminous emulsion, 10% water and either 0 or 0.3% Plaster of Paris (Stucco).

Addition of 0.5% stucco to the aggregate yields a slurry which is stable within one minute mixing time.

TABLE I

MIXING TIMES AND SET TIMES OF CATIONIC SLURRIES

| Emulsifier | % Dosage | Aggregate Mixing[a] | Comments | Set Time (min) | % Coating[b] |
|---|---|---|---|---|---|
| Amidoamine of blend of $C_{22}$-tricarboxylic acid and $C_{18}$-monocarboxylic acid | 2.0 | 10W 16E | Broke in 25 secs. | | |
| | | 12W 16E 0.1 Stu | Flow excellent | 5 | 100 |
| | | 12W 16E 0.25 Stu | Flow excellent | 5 | 100 |
| Polyamine condensate of $C_{21}$-dicarboxylic acid and kraft lignin | 2.0 | 10W 16E | Broke in 60 secs. | | |
| | | 10W 16E 0.3 Stu | Flow excellent | 1 | 100 |
| Condensate of $C_{21}$-dicarboxylic acid with polyamine/ acrylic acid condensate | 2.0 | 10W 16E | Broke in 60 secs. | | |
| | | 10W 16E 0.2 Stu | Flow excellent | 1 | 100 |

[a]Percent based on the weight of the aggregate; W = Water, E = Emulsion, Stu = Stucco.
[b]After boiling of the slurry seal specimen in water for 10 minutes.

Addition of 0.2–0.3% stucco based on the weight of the aggregate extends mixing time to at least one minute. Short set times and excellent coatings of the aggregate are achieved. Slurry mixtures which broke within one minute mixing time were obtained without the addition of stucco.

EXAMPLE II

This example shows the improvement of mixing performance when Stucco was added to a cationic slurry mix when emulsified Exxon ® (120/150 penetration) asphalt and Camak aggregate (Georgia, granite screenings) were used. Asphalt residue: 67%, emulsion pH-value 2.5. Mixing experiments were performed as in Example I.

Slurry mixtures which broke within one minute mixing time were obtained when no stucco was present.

EXAMPLE III

This example shows the improvement of the mixing behavior of anionic emulsion/aggregate mixes when small amounts (0.1–0.5%) of Plaster of Paris is added to the aggregate and small amounts (0.02% NaOH) alkali is added to the prewet water before mixing. The anionic emulsions were prepared with Exxon ® 120/150 penetration asphalt at 64% asphalt residue. The emulsifier dosage was 1.2% and the emulsion pH-value 11.0. All emulsions prepared at these conditions were stable for a long period of time. The mixes with aggregate were carried out at 80° F.

TABLE II

MIXING TIMES AND SET TIMES OF CATIONIC SLURRIES

| Emulsifier | % Dosage | Aggregate Mixing[a] Temperature | % Additive[b] | Comment | Set Time (secs) | % Coating[c] |
|---|---|---|---|---|---|---|
| Amidoamine of maleinized tall oil fatty acid | 1.5 | 120° F. | | Broke in 25 secs. | | |
| | | 120° F. | 0.5 Stu | Flow excellent | 60+ | 98 |
| | | 80° F. | | Broke in 30 secs. | | |
| | | 80° F. | 0.5 Stu | Flow excellent | 60+ | 98 |
| Amidoamine of maleinized soybean oil | 1.5 | 120° F. | | Broke in 25 secs. | | |
| | | 120° F. | 0.5 Stu | Flow excellent | 60+ | 96 |
| | | 80° F. | | Flow fair | 60+ | 96 |
| | | 80° F. | 0.5 Stu | Flow excellent | 60+ | 96 |
| Amidoamine of maleinized yellow grease | 1.5 | 120° F. | | Flow poor | 30 | 96 |
| | | 120° F. | 0.5 Stu | Flow excellent | 60+ | 98 |
| | | 80° F. | | Flow poor | 60+ | 95 |
| | | 80° F. | 0.5 Stu | Flow excellent | 60+ | 100 |
| Amidoamine of maleinized tall oil pitch | 1.5 | 120° F. | | Floor poor | 60+ | 96 |
| | | 120° F. | 0.5 Stu | Flow excellent | 60+ | 96 |

[a]Sixteen grams emulsion and 10 g water were mixed with 100 g aggregate.
[b]Percent based on the weight of the aggregate.
[c]After boiling of the test specimen in water for 10 minutes.

TABLE III

MIXING TIMES AND SET TIMES OF ANIONIC SLURRIES

| Emulsifier | % Dosage | Aggregate Mixing[a] | Comments | Set Time (min) | % Coating[b] |
|---|---|---|---|---|---|
| Tall oil fatty acid polyamine | 1.2 | 10W 16E | Broke in 10 secs. | | |

TABLE III-continued
MIXING TIMES AND SET TIMES OF ANIONIC SLURRIES

| Emulsifier | % Dosage | Aggregate Mixing[a] | Comments | Set Time (min) | % Coating[b] |
|---|---|---|---|---|---|
| condensate, carboxyethylated | | 5.5W 16E 2N | Flow excellent | 60+ | 40 |
| | | 10W 16E 2N 0.5 Stu | Flow excellent | 60+ | 95 |
| Tall oil pitch - polyamine condensate, carboxyethylated | 1.2 | 10W 16E | Broke in 5 secs. | | |
| | | 5.5W 16E 2N | Flow excellent | 60+ | 40 |
| | | 10W 16E 2N 0.5 Stu | Flow excellent | 60+ | 90 |
| Soybean oil - polyamine carboxyethylated | 1.2 | 10W 16E | Broke in 25 secs. | | |
| | | 8W 16E 2N | Flow excellent | 60+ | 30 |
| | | 8W 16E 2N 0.5 Stu | Flow excellent | 60+ | 85 |
| $C_{22}$-dicarboxylic acid/$C_{18}$-monocarboxylic acid polyamine condensate, carboxyethylated | 1.2 | 10W 16E | Broke in 50 secs. | | |
| | | 10W 16E 2N | Flow excellent | 60+ | 30 |
| | | 10W 16E 1N 0.5 Stu | Flow excellent | 95 | 90 |
| Tall oil fatty acid - polyamine condensate - fumarized | 1.2 | 10W 16E | Broke after 5 secs. | | |
| | | 10W 16E 2N | Flow excellent | 60+ | 40 |
| | | 10W 16E 2N 0.5 Stu | Flow excellent | 60+ | 90 |

[a] Percent of water (W), emulsion (E), 1% NaOH (N) and Plaster of Paris (Stucco) based on the weight of the aggregate.
[b] Determined by boiling the test specimen in water for 10 minutes.

Addition of 0.01–0.02% sodium hydroxide to the pre-wet water of the slurry seal mix extends the mixing time beyond the required one minute, but has a detrimental effect on the adhesion of the asphalt to the aggregate. Less than 50% of the aggregate surface is coated. Addition of 0.5% Plaster of Paris to the aggregate improves adhesion performance. The area of coated surface increases to 85–95%.

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. An improved bituminous emulsion-aggregate paving slurry comprising aggregate and from about 15% to about 25%, based on the weight of the aggregate, of a bituminous emulsion comprised of from about 30% to about 80%, based on the weight of the emulsion, of bitumen, from about 0.2% to about 10%, based on the weight of the emulsion, of an emulsifier selected from the group of cationic and anionic emulsifiers, and water to make up 100%, based on the weight of the emulsion, wherein the improvement comprises extended mixing time and improved adhesion of the bitumen to the aggregate after evaporation of the water by the addition to the slurry of from about 0.1% about 2%, based on the weight of the aggregate, of calcium sulfate hemihydrate.

2. An improved bituminous emulsion-aggregate paving slurry comprising aggregate and from about 15% to about 25%, based on the weight of the aggregate, of a bituminous emulsion comprised of from about 30% to about 80%, based on the weight of the emulsion, of bitumen and from about 0.2% to about 10%, based on the weight of the emulsion, of an emulsifier selected from the group of emulsifiers consisting of $C_8$–$C_{20}$ fatty amines, propane diamines, triamines, tetramines, and the reaction products of polyamines reacted with: sulfonated fatty acid; sulfonated oleic acid; the reaction products of animal fats and vegetable oils with a member of the group consisting of fumaric acid, maleic anhydride, acrylic acid and methacrylic and; the epoxidized derivative of a member of the group consisting of soybean oil, linseed oil, and esters selected from the group consisting of alkyl oleates, alkyl tallates, and animal fats obtained by epoxidation with a member of the group consisting of peracetic acid and perbenzoic acid; reaction products of rosin resin acids with a member of the group consisting of fumaric acid, maleic anhydride, acrylic acid, and methacrylic acid; $C_8$–$C_{22}$ polycarboxylic acid of the general formula

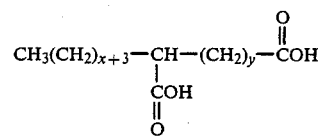

and

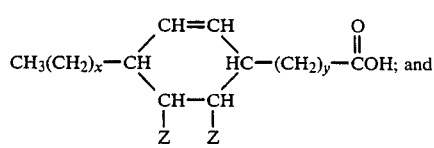

carboxylic acid anhydrides of the general formula

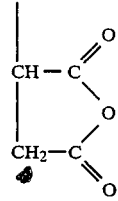

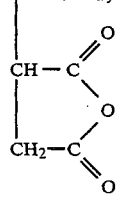

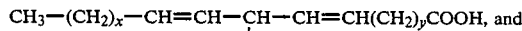
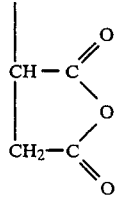

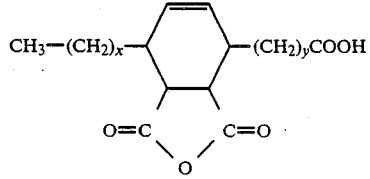

-continued

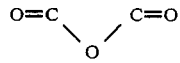

wherein x and y are integers from 3 to 9, x and y together equal 10-14, at least one Z is a carboxylic acid group and any remaining Z is hydrogen.

3. The improved paving slurry of claim 2 comprising from about 60% to about 70% bitumen and from about 0.25% to about 2.5emulsifier and wherein the emulsifier exhibits a pH in the range of from 1 to 7.

4. The improved paving slurry of claim 2 wherein the emulsifier is a complex polyamino acid obtained as the reaction product of the emulsifier of claim 2 reacted with unsaturated acids or haloalkane carboxylic acids, and the emulsifier exhibits a pH in the range of from greater than 7 to 12.

5. The improved paving slurry of claim 4 wherein the unsaturated acid is selected from the group consisting of acrylic acid, metacrylic acid, maleic acid, and fumaric acid, and the emulsifier exhibits a pH in the range of from about 10 to 11.5.

6. The improved paving slurry of claim 4 wherein the haloalkane carboxylic acid is chloroacetic acid, and the emulsifier exhibits a pH in the range of from about 10 to 11.5.

7. The improved paving slurry of claim 2 wherein the emulsifier is a complex polyamino acid obtained as the sulfomethylation reaction product of the emulsifier of claim 2 reacted with formaldehyde and a member of the group consisting of sodium sulfite and sodium bisulfite, and the emulsifier exhibits a pH in the range of from about 10 to 11.5.

8. The improved paving slurry of claim 3 wherein the emulsifier exhibits a pH in the range of from 2.5 to 4.

* * * * *

UNITED STATES PATENT AND TRADEMARK OFFICE
CERTIFICATE OF CORRECTION

PATENT NO.    : 4,944,804
DATED         : July 31, 1990
INVENTOR(S)   : Peter Schilling It is certified that errors appear in the above-identified patent and that said Letters Patent is hereby corrected as shown below:

In column 5, line 43, delete "nd" and substitute therefor --and--.

In column 7, line 68, delete "di-amindoamine" and substitute therefor --di-amidoamine--.

In column 11, line 36, delete "67%" and substitute therefor --64%--.

In Claim 3, column 16, line 16, delete "2.5emulsifier" and substitute therefor --2.5% emulsifier--.

Signed and Sealed this

Second Day of November, 1993

Attest:

BRUCE LEHMAN

Attesting Officer          Commissioner of Patents and Trademarks